United States Patent [19]

Resch

[11] Patent Number: 4,480,877

[45] Date of Patent: Nov. 6, 1984

[54] RECIRCULATING PUMP FOR MOTOR VEHICLE BRAKE SYSTEM

[75] Inventor: Reinhard Resch, Stuttgart, Fed. Rep. of Germany

[73] Assignee: Daimler-Benz Aktiengesellschaft, Fed. Rep. of Germany

[21] Appl. No.: 380,407

[22] Filed: May 20, 1982

[30] Foreign Application Priority Data

May 20, 1981 [DE] Fed. Rep. of Germany ....... 3119982

[51] Int. Cl.³ .............................................. B60T 8/02
[52] U.S. Cl. ................................ 303/116; 188/181 A; 303/61
[58] Field of Search ............... 303/116, 119, 117, 113, 303/10, 11, 61; 188/181 A

[56] References Cited

U.S. PATENT DOCUMENTS 3,836,208  9/1974  Wienecke ....................... 188/181 A

*Primary Examiner*—Bruce H. Stoner, Jr.
*Assistant Examiner*—Alvin Oberley

*Attorney, Agent, or Firm*—Craig & Burns

[57] ABSTRACT

A recirculating pumping device for an anti-locking two-circuit motor vehicle brake system, with the pumping device including one pump piston provided for each brake circuit. The pumping device recirculates brake fluid released from the wheel brake cylinder or cylinders to a master brake cylinder during an anti-locking regulating or control process. The pumping device includes piston pumps, with one pump being provided for each braking circuit of the braking system. The piston pumps are constructed as free piston pumps having working chambers connectable periodically to a pressure source provided on the vehicle through a valve. The valve is switchable at a predetermined switching frequency or may be vented to the tank of the pressure source. The pistons are preferably constructed as stepped pistons, so that the recirculating pumping device may be adapted to the pressure level of a pressure source already available on the vehicle by an appropriate selection of a ratio between the piston surfaces of the pistons.

12 Claims, 1 Drawing Figure

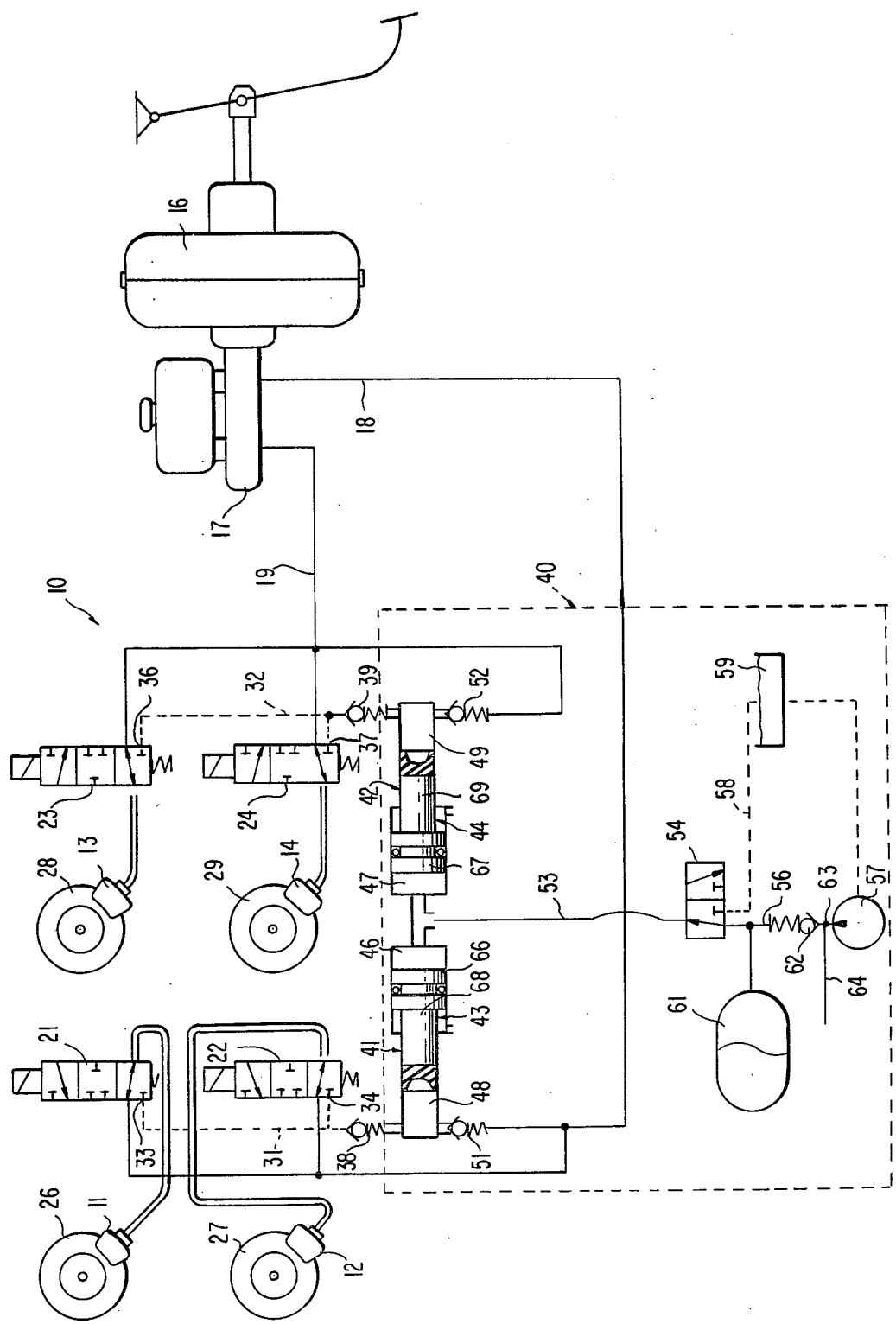

4,480,877

RECIRCULATING PUMP FOR MOTOR VEHICLE BRAKE SYSTEM

BACKGROUND OF THE INVENTION

The present invention relates to a pumping device and, more particularly, to a recirculating pump device for anti-locking motor vehicle brake systems, with an anti-locking device operating in accordance with recirculating principles.

A recirculating pumping device of the aforementioned type is proposed in, for example, German Patent Application P No. 29 44 856.4, wherein the device provides for cyclic monitoring of the state of movement of the braked wheels and, when a wheel develops a tendency to lock up, causes the brake fluid to be released from an affected wheel brake cylinder, by switching an anti-locking safety valve, as well as admitting the brake fluid, released to the lower pressure, into the brake line to be recycled, whereby one piston pump is associated with the brake circuits of the vehicle within the recirculating pumping device. A feed pressure chamber of the piston pump is connected through an inlet check valve to a recirculating line segment communicating with the wheel brake cylinders of the corresponding brake circuit, and through an outlet check valve to a brake line of the corresponding brake circuit. The drive of the piston pump is controlled by a switching valve, by means of which the working pressure chambers of the piston pumps are connectable at a predetermined switching frequency to a pressure source provided on the vehicle, or, alternatively, may be vented into a tank or reservoir of the pressure source.

In a special type construction, the recirculating pumping devices generally include recirculating pumps constructed as hydraulically driven piston pumps, with one of the pumps being associated with the front axle brake circuit and another pump being associated with the rear axle brake circuit. The effective piston surfaces of the piston which delimits the feed pressure chamber from the working and/or drive pressure chamber are of an equal size. The feed pressure chambers of the piston pumps are each connected by an inlet check valve with a segment of the brake line branch leading to the corresponding wheel brake cylinder. The segment of the brake line branch is cut off from the main brake cylinder in a regulating phase of the anti-locking device of the vehicle brake system by a corresponding brake-pressure regulating valve and connected to a segment of the brake line which leads back to the main brake cylinder by an outlet check valve. The working pressure chambers of the piston pumps are connected alternately to the tank and/or a pressure outlet of a hydraulic auxiliary pressure source in a regulating phase of the anti-locking device by an appropriate control of a switching valve which may, for example, be constructed as a solenoid valve. The corresponding recirculating pump executes a filling stroke while its working pressure chamber is connected to the tank of the auxiliary pressure source through the switching valve, under the influence of a pretensioned piston spring. The spring has a spring force which is exerted on the piston to enlarge the feed pressure chambers. The piston executes a recirculating or working stroke against the restoring force of the spring and is triggered by the connection of the working pressure chamber to the pressure outlet of the auxiliary pressure source, under the control of the switching valve, whereby the anti-locking device may execute a plurality of filling and feed strokes of the recirculating pump within a single regulating phase if such is required.

Since the first feed stroke of the piston of the corresponding or respective recirculating pump which occurs within a regulating phase of the anti-locking device operates against a pressure which corresponds approximately to the instantaneous braking pressure in the wheel brake cylinder in the above-noted proposed recirculating pumping device, and since the first feed stroke additionally is made against the restoring force of the piston spring, the auxiliary pressure source in the proposed construction must be designed for at least a starting pressure of about 200 bars which corresponds to the maximum braking pressure.

Since hydraulic auxiliary pressure sources which may be available on a motor vehicle and provided such as, for example, power steering or load-level regulation, are generally constructed for a much lower starting pressure of, for example, 60 to a maximum of 150 bars, the existing hydraulic auxiliary pressure sources cannot readily be utilized to drive the recirculating pumps and, consequently, it is necessary for an additional auxiliary pressure source to be provided to drive the recirculating pumping device, with such auxiliary pressure source delivering the necessary initial pressure of approximately 200 bars.

In order to be able to attempt to utilize an auxiliary pressure source which is already normally provided on a motor vehicle and which has an initial pressure lower than the maximum braking pressure to drive the piston pumps, at least one additional pressure transducer and high pressure reservoir chargeable thereby in addition to a storage load control arrangement are required. As can readily be appreciated, the associated technical expenses for providing the additional components is considerable. Consequently, a recirculating pumping device of the above-proposed construction does not produce any significant savings over a conventional recirculating pump assembly driven by an electric motor.

A further disadvantage of the above-proposed recirculating pumping device resides in the fact that each working stroke of the one or more recirculating pumps always recirculates the same volume of brake fluid into the brake line, that is, the volume corresponding to the intake volume of the pump. Consequently, at the end of a regulating cycle of the anti-locking device, as a rule, more brake fluid must be drawn out of the pressure-regulating wheel brake cylinder than would be required for an appropriate anti-locking regulating effect.

SUMMARY OF THE INVENTION

The aim underlying the present invention essentially resides in providing a recirculating pump device of the aforementioned type which is suitable both for a drive with an auxiliary pressure source operating a relatively low level and for a drive with an auxiliary pressure source operating at a relatively high pressure level, with the pressure source also being adapted to be utilized on the vehicle for other purposes and which permits a more accurate monitoring of the braking pressure during a regulating phase of an anti-locking device of the brake system of the motor vehicle.

In accordance with advantageous features of the present invention, the piston pumps of the recirculating pumping device are designed as free piston pumps with the pistons being constructed as stepped pistons, whereby the larger piston steps delimit the working pressure chambers on one side and the smaller piston steps delimit or define the feed pressure chambers. A ratio of the effective piston surfaces of the larger piston steps to the effective piston surfaces of the smaller piston steps is at least equal to a ratio of the maximum braking pressure which may be achieved in the brake system to the minimum initial pressure of the pressure source utilized to drive the recirculating pumps.

By adapting the recirculating pumping device to the initial pressure level of the hydraulic pressure source, which may be done by appropriately selecting the surface ratio of the pump pistons, the pressure source which is generally provided in a motor vehicle such as, for example, a power steering system or a load-level regulating device, may readily be utilized to drive the recirculating pumping device without requiring the incurring of additional expenses. For this purpose, the pressure chambers of the recirculating pumps may be connected periodically by a switching valve with a pressure outlet of the pressure source of the power steering system or level-regulating device of the motor vehicle.

Additionally, in accordance with further advantageous features of the present invention, for anti-locking regulation function for the free piston pumps to take in, during a final filling stroke, only as much brake fluid as is required to remove all pressure from the regulated wheel brakes, and, additionally, with the recirculating pumping device of the present invention, no spring drive elements, generally subject to wear, are required.

It is also possible in accordance with the present invention to provide an alternative control system which magnetically controls the switching valve. In this connection, a valve body of the switching valve may be reciprocated by means of an eccentric or crank drive driven by an electric motor. The switching valve may be periodically switched between the "on" positions which effect the alternating connection of the working pressure chambers of the recirculating pumps with the pressure source and associated tank. An operating signal of the electric motor such as, for example, from a power amplifier, may be derived from the regulating signals of the anti-locking device which are utilized to control the anti-locking safety valves.

In accordance with still further features of the present invention, the recirculating pump associated with the brake circuit delivers a feed stroke volume of 0.2 cm$^3$/second when the volume of braking fluid flowing out of at least one of the two wheel brake cylinders of a given brake circuit in an active regulation phase of the anti-locking device is approximately 2 cm$^3$/second, whereby an effective piston surface of 0.5 cm$^2$ and a feed stroke of 4 mm, with a switching repetition frequency of the switching valve being at least 20 cycles/second, and preferably slightly higher, are employed. The construction of recirculating pumps and the above-noted switching frequency of the switching valve which controls the filling and feed strokes, have shown themselves to be especially advantageous in practical testing of recirculating pumping devices constructed in accordance with the present invention.

Accordingly, it is an object of the present invention to provide a recirculating pumping device for an anti-locking motor vehicle brake system which avoids, by simple means, shortcomings and disadvantages encountered in the prior art.

Another object of the present invention resides in providing a recirculating pumping device for an anti-locking motor vehicle brake system which is simple in construction and therefore relatively inexpensive to manufacture.

Yet another object of the present invention resides in providing a recirculating pumping device for an anti-locking motor vehicle brake system which may readily use an auxiliary pressure source of a relatively high or relatively low pressure level.

A still further object of the present invention resides in providing a recirculating pumping device for an anti-locking motor vehicle brake system which enables an accurate monitoring of a braking pressure of the brake system.

A still further object of the present invention resides in providing a recirculating pumping device for an anti-locking motor vehicle brake system which functions reliably under all braking conditions.

These and other objects, features, and advantages of the present invention will become more apparent from the following description when taken in connection with the accompanying drawing which shows, for the purpose of illustration only, one embodiment in accordance with the present invention, and wherein:

BRIEF DESCRIPTION OF THE DRAWING

The single FIGURE is a simplified schematic view of a two-circuit brake system for a motor vehicle, equipped with an anti-locking device operating in accordance with a recirculating principle and with a recirculating pumping device constructed in accordance with the present invention.

DESCRIPTION OF ILLUSTRATIVE EMBODIMENT

Referring now to the single FIGURE of the drawing, according to this FIGURE, a two-circuit brake system generally designated by the reference numeral 10 includes an anti-locking device, of a conventional construction, with, for example, without limiting the general nature of the present invention, the anti-locking device being adapted to act individually on each of the four wheel brakes 11, 12, 13, 14 of a front axle brake circuit or rear axle brake circuit.

The brake system 10 includes a tandem master brake cylinder 17 operated, in a conventional manner, by a pedal through a braking force booster 16. Brake lines 18, 19 extend from an output pressure chamber of the master cylinder 17 to supply pressure medium to a front axle brake circuit 11, 12 and rear axle brake circuit 13, 14.

Four blocking safety valves 21, 22, 23, 24 are respectively provided for each of the wheel brakes 11, 12, 13, 14. The safety valves 21–24 constructed as electrically controllable three-way solenoid valves, with the respective valves having two different "on" positions and one "off" position. In the first "on" position, which corresponds to the basic or normal position of the blocking safety valves 21–24, the pressure chambers of the wheel brake cylinders are connected in such a manner so as to communicate the corresponding brake lines 18, 19 with the corresponding output pressure chambers of the tandem brake master cylinder 17. This switch position corresponds to a "normal" braking situation, in which the respective wheels exhibit no tendency to lock up.

For the purpose of providing an electronic portion of the anti-locking device, not shown in detail, the output signals of which control the anti-locking valves 21-24, it is noted that the following conventional functional elements may be provided.

More particularly, a transducer means may be provided for detecting a rotational speed of the individual wheels in a continuously repeating scanning cycle at preset intervals with the transducer means being provided at each of the braked wheels 26, 27, 28, 29. The transducer means is adapted to generate an electrical output signal which is characteristic of such applications. The electronic evaluating circuit (not shown) determines from the output signals of the transducer by way of a comparison, which of the braked wheels 26-29 is or are showing a tendency to lock up, with the evaluating circuit generating control signals to the anti-locking safety valves 21-24 associated with the affected wheel or wheels.

The anti-locking device operates in the following manner. As soon as one of the braked wheels 26-29, for example, the right front wheel 26, shows a tendency to lock up during a braking operation, the processing electronic evaluating circuit generates a first output signal which actuates the anti-locking safety valve 21 associated with the wheel 26 to move the safety valve 21 to the "off" position. The movement of the safety valve to the "off" position interrupts a connection between the wheel brake cylinder and the brake line 18 so that the braking pressure in the wheel brake cylinder of the braked wheel 26 cannot rise any further. If the braked wheel 26 continues to show a tendency to lock up, then the processing electronic circuitry generates an additional control signal during a next regulating cycle which throws the entire locking safety valve 21 to a second "on" position, in which the wheel brake cylinder of the wheel 26 is connected to a return line 31 through a second flow path opened up when the anti-locking safety valve 21 is in the second "on" position, so that the brake fluid can flow out of the wheel brake cylinder of the braked wheel 26 to reduce the pressure in the brake cylinder through the return line 31.

The same principles noted above apply to the control of the additional anti-locking safety valves 22-24, wherein only one return 31 or 32 is provided for the respective brake circuits 11, 12 and 13, 14. The lines 31, 32 are connected to the return lines 33, 34, 36, 37 for the anti-locking safety valves 21, 22, 23, 24, which serve the front-axle braking circuit and rear-axle braking circuit.

The two return lines 31, 32 are each connected by a check valve 38 or 39 to a recirculating pumping device generally designated by the reference numeral 40. The recirculating pumping device 40 recycles the brake fluid released during an active regulation operating phase of the anti-locking device through the return line 31 or 32 from one or more of the wheel brake cylinders, back into the corresponding brake lines 18 or 19 to the corresponding pressure chamber of the tandem brake master cylinder 17.

The recirculating pumping device 40 operates in the following manner:

For each of the two brake circuits 11, 12 and 13, 14, a hydraulically drivable piston pump 41 or 42 is provided and forms a recirculating pump. The pistons 43, 44 of the pump each delimit, within a pump housing, one working pressure chamber 46 or 47 and one feed pressure chamber 48 or 49. The feed pressure chambers 48 and 49 are connected through the check valves 38 and 39 to the return line 31 of the front axle brake circuit or the return line 32 of the rear axle brake circuit and, through additional check valves 51 or 52, to brake lines 18 and 19 of the front axle brake circuit and rear axle brake circuit.

The two working pressure chambers 46 and 47 are connected through a common connecting line 53 and a switching valve 54 which may, for example, be constructed as a conventional three-way/two-way valve having switching means such as relatively slidable members providing alternate fluid flow paths, depending on the switch position, either with a working pressure connection 56 of a hydraulic pressure source 57, already provided on the motor vehicle, or through a relief line 58 with a supply tank or reservoir 59 maintained at a zero pressure. The supply tank or reservoir 59 contains a supply of pressure medium for the pressure source 57 and forms the tank or reservoir of the pressure source 57. For example, the hydraulic pump for a power steering system or another suitable hydraulic pressure-regulating system normally provided on the vehicle is suitable as a pressure source 57 for the recirculating pumping device 40.

The pressure reservoir 61 is additionally connected to a working pressure connection 56, with the reservoir being fillable through a check valve 62. The check valve 62 is connected between a working pressure connection 56 and a pressure outlet 63 of the pressure source 57. A pressure line 64 extends from the pressure outlet 63 to main consumer leads of the motor vehicle.

The two recirculating pumps 41, 42 are constructed as so-called free piston pumps, that is, no restoring element such as, for example, a pretensioned return spring, is required to force the pistons 43 or 44 into a designated basic position. In the illustrated embodiment, the pistons 43, 44 are constructed as stepped or differential pistons, with the working pressure chambers 46 and 47 of the respective pumps 41, 42 being delimited or defined by the larger piston steps 66, 67, and the feed pressure chambers 48, 49 being delimited or defined by the smaller piston steps 68, 69.

By an appropriate dimensioning of the effective piston areas of the smaller piston steps 68, 69 are larger piston steps 66, 67, the recirculating pumps 41, 42 can be adapted to the pressure level of the pressure source 57 which, as a rule is generally lower than the braking pressure generated in the braking system 10 which, as noted above, may be as much as 200 bars. Furthermore, the surfaces of the smaller piston steps 68, 69, delimiting the feed pressure chambers 48, 49 of the recirculating pumps 41, 42 on the one side, and the strokes of the pistons 43, 44 as well as the stroke repetition frequency, determined by the switching repetition frequency of the switching valve 54, must be selected so that the rcirculating pumps 41, 42, in those phases of the anti-locking regulation process in which the brake fluid is released from one or more wheel brake cylinders of the corresponding brake circuit, are able to fully return the quantities of brake fluid which are delivered per unit time through the corresponding returns 31, 32 to the brake lines 18 and 19 and/or the tandem brake master cylinder 17.

In a situation wherein an anti-locking control or regulation is fully effective, a typical value for a volume of brake fluid released per unit of time from a wheel brake cylinder is about 2 $cm^3$/second. Accordingly, the delivery values of the two recirculating pumps 41, 42 must be at least 4 $cm^3$/second each. Under a realistic assumption that an effective piston respective areas of the smaller piston steps 68, 69 of the two pump pistons 43, 44 are 0.5 cm² and the maximum piston strokes are 4 mm, that is, the delivery per stroke is 0.2 cm³, a stroke repetition frequency and switching repetition frequency of the switching valve 54 must be at least about 20 Hz, which frequency is approximately twice a maximum regulating cycle frequency that is practically feasible. It is understood that when the piston stroke and effective piston surfaces of the smaller piston steps 68, 69 are larger, it may be appropriate to select a smaller feed stroke and switching repetition frequency of the switching valve 54. The switching valve 54 may, for example, be constructed as a solenoid valve and be controllable by a current pulse train providing the necessary switching frequency. With the switching valve 54 constructed as a solenoid valve, it would be necessary to provide a current pulse generator (not shown) for delivering current pulses of a suitable power at the required frequency.

It is also possible for the switching valve to be constructed as a piston valve having a piston which may be caused to reciprocate or be displaced by a motor-driven eccentric or crank drive (not shown).

Essentially, the switching valve 54 may be switched during a continuous operation. The recirculating pumps 41, 42 will not be activated thereby provided the anti-locking device of the vehicle brake system is also not in operation, since the pistons 43, 44 of the recirculating pumps 41, 42, connected as free pistons, remain in the position associated with a mininum value for the feed pressure chambers 48, 49, even if the pressure in the working pressure chambers 46, 47 continuously changes.

However, in order to avoid unnecessary wear on the switching valve 54, it is advantageous for the switching valve 54 to be activatable together with the anti-locking device. In order to ensure a functionally correct activation of the switching valve 54, suitable control signals may be derived from known electric means (not shown) capable of generating power output signals utilized to activate the anti-locking safety valves 21–24 from a control electronic system provided within the anti-locking device.

The recirculating pump device of the present invention described hereinabove operates within a framework of the anti-locking device for the brake system 10 in the following manner:

For the purposes of explanation of the operation of the recirculating pump device 40, it would be assumed that, in the course of a braking operation of the motor vehicle, the right front wheel 26 of the vehicle has reached a locking limit, so that the corresponding anti-locking safety valve 21, in a first control cycle, has been caused to move first into its "off" position and then, in subsequent and additional regulating cycles, into the "on" position which connects the wheel brake cylinder of the front wheel 26 with the return line 31. Assumming that the switching valve 54 is constructed as a solenoid valve and also assuming that a current pulse generator is employed to control a position of the solenoid valve and the valve 54 is actuated as soon as the electronic power supply of the anti-locking device generates an "off" output signal for the anti-locking safety valve 21, the switching valve is already operating when the anti-locking safety valve 21 is moved to the second "on" position.

As soon as the pressure in the return line 31, which is now in communication with the wheel brake cylinder of the right front wheel 26, has risen to a point where the intake check valve 38 of the recycling pump 41 opens, the brake fluid flows into its feed pressure chamber 48 and the valve piston 43 executes a filling stroke as soon as the working pressure chamber 46 has been discharged through the switching valve 54 of the supply tank 59. After the switching valve 54 has switched to the position in which the working pressure chamber 46 is connected to the pressure source 57 and/or the pressure reservoir 61, the valve piston 43 executes the feed stroke, whereby the pressure rise in the feed pressure chamber 48 closes the inlet check valve 38 and opens the outlet check valve 51 to the brake line 18.

The above-noted operation of the recirculating pump 41 for the front wheel 26 and switching valve 54 is repeated as long as the anti-locking safety valve 51 receives a control signal, whereby, during each operating cycle of the recirculating pump 41, the volume or amount of brake fluid recycled in the brake line is exactly the volume amount drained from the wheel brake cylinder of the front wheel 26.

As can readily be appreciated, the recirculating pumping device 40 of the present invention is not limited to the specific details described hereinabove, namely, an anti-locking device with a four-channel regulation or control, but rather is also suitable for an anti-locking device with a three-channel regulation, wherein the anti-locking protecting regulation or control of the rear wheel brakes 13, 14 may be accomplished through a single anti-locking valve. In situations wherein a higher delivery rate for the pressure source 57, that is, when the load upon the pressure source 57 occasioned by the driving of the recirculating pump 41, 42 is only slight, it is possible to dispense with or eliminate the pressure reservoir 61.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such changes and modifications as are encompassed by the scope of the appended claims.

I claim:

1. A recirculating pump device for a motor vehicle brake system having a master cylinder having respective pressure chambers connected to brake circuits with wheel brake cylinders and being equipped with anti-locking means operable on a recirculating principle, the anti-locking means being adapted to cyclically monitor a state of movement of braked wheels of the vehicle and to cause brake fluid from a wheel developing a tendency to lock up to be released from the brake cylinders of the affected wheel into a brake fluid return line leading to the master cylinder to be recycled thereby lowering a pressure in the brake cylinder, characterized in that the recirculating pump device includes at least one piston pump associated with each brake circuit of the brake system, each piston pump including a feed pressure chamber and a working pressure chamber, means for connecting the feed pressure chamber with recirculating line means communicating with the wheel brake cylinders of the respective brake circuits and to a brake line of the corresponding brake circuit leading to the respective pressure chamber of the master cylinder, pressure source means of the motor vehicle for forming a drive for the piston pumps, means for controlling the drive of the respective piston pumps such that the working pressure chambers are adapted to be connected at a predetermined frequency, being higher than a maximum frequency of a regulating cycle of the anti-locking means, to at least one of the pressure source means of the motor vehicle and a vent of a tank associated with the pressure source means, the piston pumps being constructed as free piston pumps each having a piston of a stepped configuration, a larger of the steps of each piston delimits the working pressure chamber, a smaller of the steps of each piston delimits the feed pressure chamber, and in that a ratio of effective piston surface area of the larger piston steps to the effective piston surface area of the smaller piston steps is at least equal to a ratio of a maximum braking pressure achievable in the brake system to a minimum initial pressure of the pressure source means.

2. A recirculating pumping device according to claim 1, characterized in that the means for connecting the feed pressure chamber with the recirculating line means includes an inlet valve means and an outlet check valve means.

3. A recirculating pumping device according to one of claims 1 or 2, characterized in that the means for controlling the drive of the respective piston pumps includes a switching valve adapted to periodically connect the working pressure chambers with a pressure outlet of the pressure source, and in that the pressure source is one of a power steering system and a load level regulating means of the motor vehicle.

4. A recirculating pumping device according to claim 3, characterized in that the switching valve includes a valve body, and in that shifting means are provided for periodically shifting the valve body between "on" positions so as to effect an alternating connection of the working pressure chambers with the pressure source and the associated tank, and in that means are provided for connecting the shifting means with the anti-locking means such that an operating signal from the shifting means is derived from regulating signals of the anti-locking means.

5. A recirculating pumping device accorinding to claim 4, characterized in that the shifting means includes a drive motor and one of an eccentric and crank drive means connected to the drive motor, and in that an operating signal of the drive motor is received from a power amplifier.

6. A recirculating pumping device according to claim 5, characterized in that each pump piston has a feed stroke volume of 0.2 cm$^3$/second when a volume of brake fluid flowing out of at least one of two brake cylinders of a given brake circuit in an active regulation phase of the anti-locking means is approximately 2 cm$^3$/second, the ratio of effective piston surfaces is 0.5 cm$^2$, a feed stroke of each of the pistons is 4 mm, and in that a switching frequency of the switching valve is at least 20 Hz.

7. A recirculating pumping device according to claim 6, characterized in that the switching frequency is slightly more than 20 Hz.

8. A recirculating pumping device according to claim 1, characterized in that the means for controlling the drive of the respective piston pumps includes a switching valve, the switching valve includes a valve body, and in that shifting means are provided for periodically shifting the valve body between "on" positions so as to effect an alternating connection of the working pressure chambers with the pressure source and the associated tank, and in that means are provided for connecting the shifting means with the anti-locking means such that an operating signal for the shifting means is derived from regulating signals of the anti-locking means.

9. A recirculating pumping device according to claim 1, characterized in that each pump piston has a feed stroke volume of 0.2 cm$^3$/second when a volume of brake fluid flowing out of at least one of two brake cylinders of a given brake circuit in an active regulation phase of the anti-locking means is approximately 2 cm$^3$/second, the ratio of the effective piston surface is 0.5 cm$^2$, a feed stroke of each pump piston is 4 mm, and in that the predetermined frequency is at least 20 Hz.

10. A recirculating pumping device according to claim 1, characterized in that the anti-locking means includes anti-locking safety valves associated with each brake cylinder, each of said safety valves is adapted to be displaced to a first position interrupting a communication between the associated brake cylinder and a brake fluid source upon the associated wheel tending to lock, and at least one further position communicating the associated brake cylinder with the brake fluid return line of the brake system.

11. A recirculating pumping device according to one of claims 1 or 10, characterized in that the means for controlling the drive of the respective piston pumps includes a solenoid valve, and in that a current pulse generator means is provided for supplying current pulses to the solenoid valve at the predetermined frequency.

12. A recirculating pump device for a motor vehicle brake system having a master cylinder having respective pressure chambers connected to brake circuits with wheel brake cylinders and being equipped with an anti-locking means operable on a recirculating principle, the anti-locking means being adapted to cyclically monitor a state of movement of braked wheels of the vehicle and to cause brake fluid from a wheel developing a tendency to lock up to be released from the brake cylinders of the affected wheel into a brake fluid return line leading to the master cylinder to be recycled thereby lowering a pressure in the brake cylinder, characterized in that the recirculating pump device includes at least one piston pump associated with each brake circuit of the brake system, each piston pump including a feed pressure chamber and a working pressure chamber, means for connecting the feed pressure chamber with a recirculating line means communicating with the wheel brake cylinders of the respective brake circuits and to a brake line of the corresponding brake circuit leading to the respective pressure chamber of the master cylinder, pressure source means of the motor vehicle for forming a drive for the piston pumps, means for controlling the drive of the respective piston pumps such that the working pressure chambers are adapted to be connected at a predetermined frequency, being higher than a maximum frequency of a regulating cycle of the anti-locking means, to at least one of the pressure source means of the motor vehicle and a vent of a tank associated with the pressure source means, the piston pumps being constructed as free piston pumps each having a piston of a stepped configuration, a larger of the steps of each piston delimits the working pressure chamber, a smaller of the steps of each piston delimits the feed pressure chamber, a ratio of the effective piston surface area of the larger piston steps to effective piston surface area of the smaller piston steps being at least equal to a ratio of a maximum braking pressure achievable in the brake system to a minimum initial pressure of the pressure source means, and wherein the means for connecting the feed pressure chamber with the recirculating line means includes an inlet valve means and an outlet check valve means.

* * * * *